(12) United States Patent
Sakamoto et al.

(10) Patent No.: US 12,061,280 B2
(45) Date of Patent: Aug. 13, 2024

(54) ELECTRONIC APPARATUS, METHOD, NON-TRANSITORY COMPUTER READABLE MEDIUM, AND ELECTRONIC SYSTEM

(71) Applicants: KABUSHIKI KAISHA TOSHIBA, Tokyo (JP); Toshiba Energy Systems & Solutions Corporation, Kawasaki (JP)

(72) Inventors: Takafumi Sakamoto, Tokyo (JP); Yuki Yonezawa, Ayase Kanagawa (JP); Tomohiro Tobari, Yokohama Kanagawa (JP); Takanori Kouta, Tokyo (JP)

(73) Assignees: KABUSHIKI KAISHA TOSHIBA, Tokyo (JP); TOSHIBA ENERGY SYSTEMS & SOLUTIONS CORPORATION, Kanagawa (JP)

( * ) Notice: Subject to any disclaimer, the term of this patent is extended or adjusted under 35 U.S.C. 154(b) by 358 days.

(21) Appl. No.: 17/468,145

(22) Filed: Sep. 7, 2021

(65) Prior Publication Data

US 2022/0011397 A1  Jan. 13, 2022

Related U.S. Application Data

(63) Continuation of application No. PCT/JP2020/008944, filed on Mar. 3, 2020.

(51) Int. Cl.
*G01S 5/02* (2010.01)

(52) U.S. Cl.
CPC .................. *G01S 5/0284* (2013.01)

(58) Field of Classification Search
CPC .................................... G01S 5/0284
USPC .......................................................... 342/450
See application file for complete search history.

(56) References Cited

U.S. PATENT DOCUMENTS

| | | | |
|---|---|---|---|
| 7,720,026 B2 | 5/2010 | Chen et al. |
| 9,143,954 B2 | 9/2015 | Hibara et al. |
| 9,571,214 B2 | 2/2017 | Tohzaka et al. |
| 9,706,515 B1 | 7/2017 | Chadwick |

(Continued)

FOREIGN PATENT DOCUMENTS

| | | | |
|---|---|---|---|
| JP | 2008178006 A | 7/2008 |
| JP | 2008298721 A | 12/2008 |

(Continued)

OTHER PUBLICATIONS

Related U.S. Appl. No. 17/469,719; First Named Inventor: Yuki Yonezawa; Title: "Electronic Apparatus, Method, and Electronic System"; filed Sep. 8, 2021.

(Continued)

*Primary Examiner* — Harry K Liu
(74) *Attorney, Agent, or Firm* — Holtz, Holtz & Volek PC

(57) ABSTRACT

According to one embodiment, an electronic apparatus includes processing circuitry configured to set, based on first information indicating a plurality of candidate positions where a plurality of wireless devices are located, first candidate positions which are part of the plurality of candidate positions, and estimate first wireless devices each located at any of the first candidate positions among the plurality of wireless devices, based on second information regarding communication among the plurality of wireless devices each located at any of the plurality of candidate positions.

13 Claims, 20 Drawing Sheets

(56) References Cited

U.S. PATENT DOCUMENTS

| | | | |
|---|---|---|---|
| 9,980,085 B2 | 5/2018 | Yonezawa et al. | |
| 10,182,306 B2 | 1/2019 | Kanayama et al. | |
| 10,359,503 B2 | 7/2019 | Igura | |
| 10,587,987 B2* | 3/2020 | Thoresen | H04L 67/535 |
| 10,677,883 B2 | 6/2020 | Patel et al. | |
| 2013/0260781 A1 | 10/2013 | Un et al. | |
| 2018/0279078 A1 | 9/2018 | Yonezawa et al. | |
| 2020/0084574 A1* | 3/2020 | Kwon | H04W 4/33 |
| 2020/0198581 A1 | 6/2020 | Ette | |
| 2021/0190927 A1 | 6/2021 | Sakamoto et al. | |
| 2021/0194423 A1 | 6/2021 | Yonezawa et al. | |

FOREIGN PATENT DOCUMENTS

| | | | |
|---|---|---|---|
| JP | 2010190629 A | 9/2010 | |
| JP | 2012004726 A | 1/2012 | |
| JP | 2012124936 A | 6/2012 | |
| JP | 5266976 B2 | 5/2013 | |
| JP | 2013246118 A | 12/2013 | |
| JP | 2014016291 A | 1/2014 | |
| JP | 6564063 B2 | 6/2014 | |
| JP | 2017032469 A | 2/2017 | |
| JP | 2017227600 A | 12/2017 | |
| JP | 2018155674 A | 10/2018 | |
| JP | 2018189639 A | 11/2018 | |
| JP | 6517623 B2 | 5/2019 | |
| JP | 2020038112 A | 3/2020 | |
| JP | 2020094837 A | 6/2020 | |
| WO | 2012104983 A1 | 8/2012 | |
| WO | 2016125489 A1 | 8/2016 | |

OTHER PUBLICATIONS

International Search Report (ISR) dated Jun. 9, 2020 issued in International Application No. PCT/JP2020/011766.

Yonezawa, et al., "Technique to Swiftly Obtain Information on Luminaire Locations after Introduction of Wireless Lighting Control Systems", Toshiba Review, vol. 74, No. 3, pp. 44-47, published May 23, 2019.

Kajita, et al., "Examination Of The Automatic Identification Technique Of Air-Conditioning Apparatus Based On BLE Electric Wave Positioning", Multimedia, Distributed, Cooperative and Mobile Symposium, 2018 (DICOMO2018), Information Processing Society of Japan, pp. 828-836, Jul. 4, 2018.

International Search Report (ISR) dated Jun. 2, 2020 issued in International Application No. PCT/JP2020/008944.

Office Action (Non-Final Rejection) dated Oct. 27, 2023, issued in related U.S. Appl. No. 17/469,719.

* cited by examiner

| CANDIDATE POSITION | x | y | WIRELESS DEVICE 200 |
|---|---|---|---|
| p1 | 1 | 1 | ? |
| p2 | 1 | 2 | d2 |
| p3 | 2 | 1 | ? |
| p4 | 2 | 2 | ? |
| p5 | 3 | 1 | ? |
| p6 | 3 | 2 | ? |
| p7 | 4 | 1 | ? |
| p8 | 4 | 2 | ? |

FIG. 7A

| CANDIDATE POSITION | GROUP |
|---|---|
| p1 | g1 |
| p2 | g1 |
| p3 | g2 |
| p4 | g2 |
| p5 | g2 |
| p6 | g2 |
| p7 | g2 |
| p8 | g2 |

FIG. 7B

RECEPTION SIDE WIRELESS DEVICE [dBm]

| | d1 | d2 | d3 | d4 | d5 | d6 | d7 | d8 |
|---|---|---|---|---|---|---|---|---|
| d1 | | -50 | -55 | -70 | -75 | -77 | -94 | -95 |
| d2 | -50 | | -54 | -75 | -73 | -77 | -93 | -90 |
| d3 | -57 | -52 | | -72 | -70 | -69 | -94 | -93 |
| d4 | -70 | -72 | -75 | | -50 | -53 | -70 | -72 |
| d5 | -72 | -70 | -74 | -49 | | -50 | -73 | -72 |
| d6 | -79 | -78 | -74 | -59 | -50 | | -77 | -72 |
| d7 | -93 | -95 | -100 | -72 | -74 | -77 | | -45 |
| d8 | -95 | -92 | -95 | -80 | -79 | -81 | -50 | |

(TRANSMISSION SIDE WIRELESS DEVICE — row labels)

FIG. 8

ESTIMATED RESULT OF GROUP ESTIMATOR

| GROUP | WIRELESS DEVICES BELONGING TO GROUP |
|---|---|
| g1 | [ d1, d2 ] |
| g2 | [ d3, d4, d5, d6, d7, d8 ] |

ELECTRONIC APPARATUS, METHOD, NON-TRANSITORY COMPUTER READABLE MEDIUM, AND ELECTRONIC SYSTEM

CROSS REFERENCE TO RELATED APPLICATIONS

This application is a Continuation of International Application No. PCT/JP2020/008944, filed on Mar. 3, 2020, the entire contents of which are incorporated herein by reference.

FIELD

Embodiments described herein relate to an electronic apparatus, a method, a non-transitory computer readable medium, and an electronic system.

BACKGROUND

It is known that positions where a plurality of wireless devices are located are estimated by measuring propagation characteristics (for example, an RSSI) of electromagnetic waves the plurality of wireless devices. When the number of the wireless devices increases, it is desired to reduce a calculation amount for estimating the positions where the plurality of wireless devices are located.

BRIEF DESCRIPTION OF THE DRAWINGS

FIGS. 7A and 7B are diagrams illustrating candidate positions, coordinates and groups in the communication system 400;

FIG. 8 is a diagram illustrating an example of an RSSI among wireless devices 200$d1$-$d8$;

DETAILED DESCRIPTION

Figure 1:
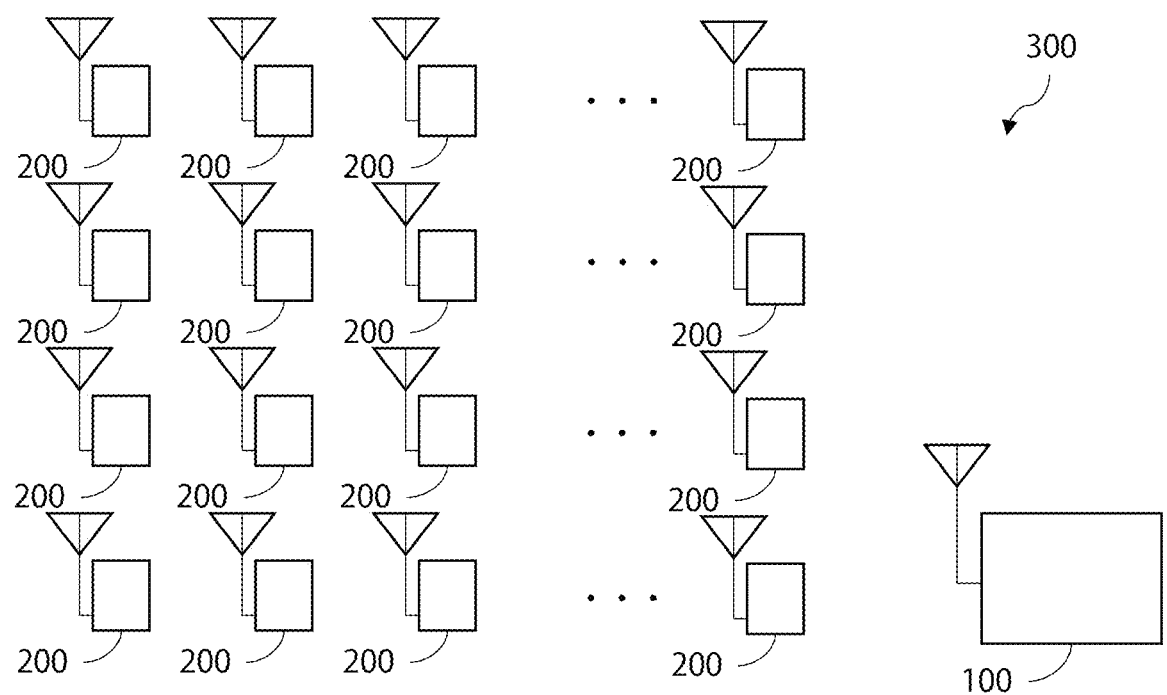
FIG. 1 is a diagram describing a communication system 300.

According to one embodiment, an electronic apparatus includes processing circuitry configured to determine, based on first information indicating a plurality of candidate positions where a plurality of wireless devices are located, first candidate positions which are part of the plurality of candidate positions, and estimate first wireless devices each located at any of the first candidate positions among the plurality of wireless devices, based on second information regarding communication among the plurality of wireless devices each located at any of the plurality of candidate positions.

Hereinafter, embodiments for implementing the invention will be described with reference to the drawings. The disclosure is merely an example, and the invention is not limited by contents described in the embodiments below. Modifications that can be easily conceived by those skilled in the art are naturally included in the scope of the disclosure. In order to make description clearer, in the drawings, a size, a shape and the like of each portion may be changed with respect to the actual embodiments and schematically illustrated. In the plurality of drawings, same reference numbers are attached to corresponding elements and detailed description may be omitted.

First Embodiment

The first embodiment will be described. FIG. 1 illustrates a communication system 300 (an electronic system) relating to the first embodiment. The communication system 300 includes an estimation apparatus 100 and a plurality of wireless devices 200. The estimation apparatus 100 is a device which acquires information (hereinafter, also referred to as candidate information) indicating candidates (hereinafter, also referred to as candidate positions) of positions where the wireless devices 200 are located and information (hereinafter, also referred to as communication information) regarding communication among the wireless devices 200, and estimates at which candidate positions the respective wireless devices 200 are located. As an application example, in a case where the wireless devices 200 are provided in apparatuses such as a lighting fixture, an air conditioner or a solar battery module, the estimation apparatus 100 can estimate the positions of the apparatuses provided with the wireless devices 200 by estimating the positions of the wireless devices 200. FIG. 1 illustrates the communication system 300 in which the wireless devices 200 are arranged in a grid shape, however, arrangement of the wireless devices 200 is not limited to this case. The estimation apparatus 100 and the wireless devices 200 can communicate between the estimation apparatus 100 and the wireless device 200 and among the plurality of wireless devices 200. The communication includes at least one of exchange required for the communication and transmission and reception of signals. FIG. 1 illustrates the case where the communication is wirelessly performed, however, the communication may be performed at least partially by wire. For a wireless communication standard, an arbitrary standard such as Wi-Fi®, Bluetooth® or UWB (Ultra Wide Band) is applicable. When estimating the positions of the wireless devices 200, the estimation apparatus 100 groups some candidate positions of the acquired candidate positions as estimation objects of the positions where the wireless devices 200 are located (hereinafter, the grouped candidate positions are also referred to as an estimation group). The estimation apparatus 100 estimates wireless devices 200A located at any candidate positions of the estimation group among the wireless devices 200, and estimates the positions where the wireless devices 200A are located from the estimation group. By estimating the positions where the wireless devices 200 are located for each estimation group, the estimation apparatus 100 can reduce a calculation amount required for estimation compared to the case of performing the estimation without grouping, and can reduce estimation time and improve estimation accuracy in fixed estimation time.

Figure 2:
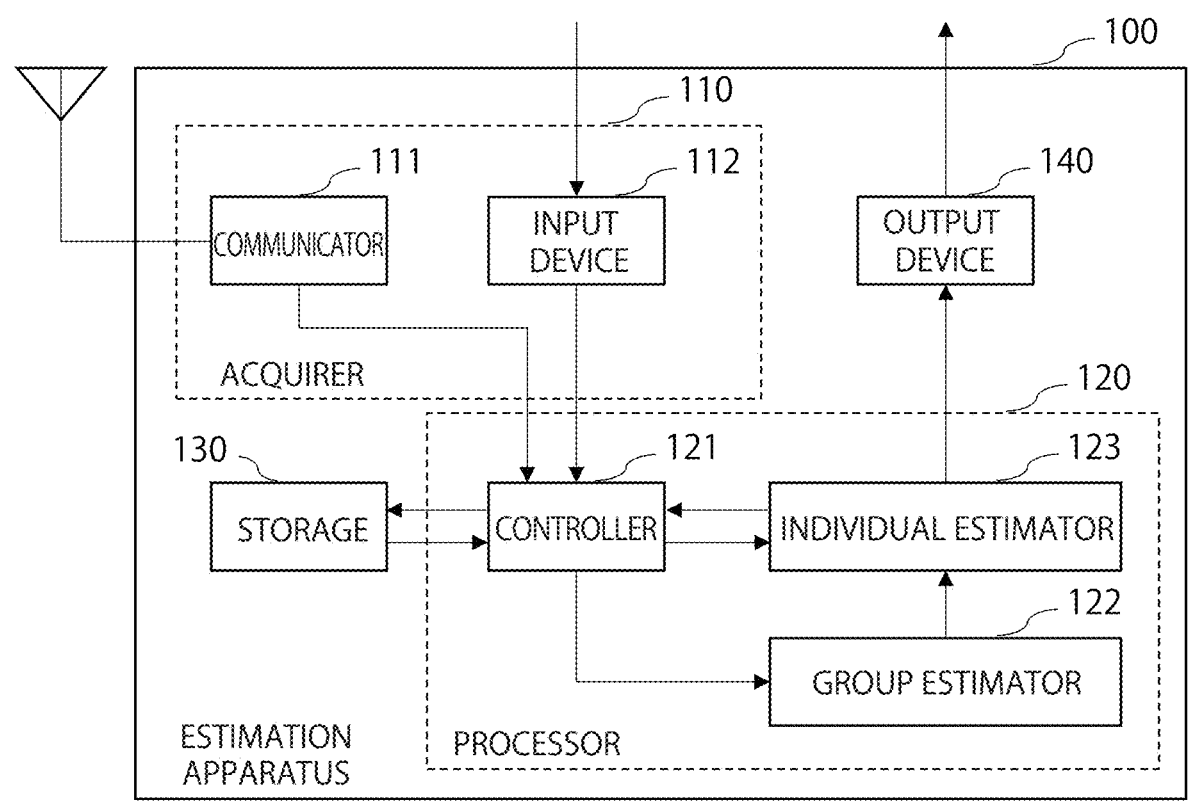
FIG. 2 is a block diagram of an estimation apparatus 100.

FIG. 2 is a block diagram of the estimation apparatus 100 (an electronic apparatus). A configuration of the estimation apparatus 100 will be described using FIG. 2. The estimation apparatus 100 includes an acquirer (acquisition circuitry) 110, a processor (processing circuitry) 120, a storage 130, and an output device (output circuitry) 140. The acquirer 110 includes a communicator 111 and an input device 112, and the processor 120 includes a controller 121, a group estimator 122, and an individual estimator 123.

The communicator 111 includes an antenna, and transmits and receives wireless signals by communication. For example, the communication can be performed with the wireless devices 200 and a database or the like. The communicator 111 receives and acquires the communication information from the wireless devices 200. The communication information includes propagation information such as an RSSI (Received Signal Strength Indicator) or a PER (Packet Error Rate) in the communication among the plurality of wireless devices 200, identification information of the wireless devices 200 in the communication among the plurality of wireless devices 200, and information indicating the reception time of signals and a channel number used for the communication or the like, for example. The identification information is the information which specifies each wireless device 200, and the estimation apparatus 100 can individually specify each wireless device 200 included in the communication system 300 by the identification information. The identification information is a MAC address or an IP address for example, but arbitrary information is applicable as long as each wireless device 200 can be individually specified. The communicator 111 may acquire the communication information through the communication of the database or the like. The communication information is used for estimating the wireless devices 200A located at any candidate positions of the estimation group and estimating the positions where the wireless devices 200A are located.

The input device 112 acquires inputted information, or acquires information by performing informatization processing to an object. For example, the input device 112 may acquire the candidate information by input from a user, may input or scan a drawing describing the positions where the wireless devices 200 are located or the like and acquire the candidate information by image processing or the like, or may photograph or input an image indicating an installation situation of the wireless devices 200 and acquire the candidate information by the image processing or the like. The input device 112 of the estimation group acquires information (hereinafter, unit group information) regarding the number of the candidate positions included in the estimation group. The unit group information may be set to the estimation apparatus 100 beforehand, and this case is also assumed to be included in acquisition of the unit group information. The candidate information and the unit group information are used for setting the estimation group. The input device 112 acquires information (hereinafter, also referred to as known information) indicating the positions where some wireless devices among the wireless devices 200 are located. The known information is used for setting the estimation group, estimating the wireless devices 200A located at any candidate positions of the estimation group and estimating the positions where the wireless devices 200A are located or the like.

In addition, after the estimation apparatus 100 estimates and outputs the positions of the respective wireless devices 200A, a response to the positions of the respective wireless devices 200A is inputted to the input device 112. The response indicates that the estimated positions of the respective wireless devices 200A are correct or at least partially corrected positions among the estimated positions of the respective wireless devices 200A or the like. The response may be inputted by the user, or may be transmitted by signals. By the response, the estimation apparatus 100 can determine the positions of the respective wireless devices 200A.

In FIG. 2, the acquirer 110 includes the communicator 111 and the input device 112, however, the acquirer 110 may include at least one of them or may include a new device which acquires information or signals. In the present embodiment, as one example, the communicator 111 acquires the communication information, and the input device 112 acquires the candidate information, the unit group information, the known information and the response. As long as the acquirer 110 can acquire the candidate information, the communication information, the unit group information, the known information and the response, an arbitrary acquisition method is applicable. For example, the communicator 111 may receive and acquire at least one of the candidate information, the unit group information, the known information and the response, and the input device 112 may acquire the communication information. The candidate information, the communication information, the unit group information and the known information acquired by the acquirer 110 are sent to the controller 121.

The controller 121 makes the storage 130 hold the candidate information, the communication information, the unit group information and the known information sent from the acquirer 110, and sends at least one piece of the information among the information held in the storage 130 to the group estimator 122 and the individual estimator 123. In addition, the controller 121 determines the positions of the respective wireless devices 200A based on the estimated positions of the respective wireless devices 200A and the response (hereinafter, the information including the determined positions of the wireless devices 200A is also referred to as determined information). The controller 121 makes the storage 130 hold the determined information.

The group estimator 122 sets some of the plurality of candidate positions included in the candidate information as an estimation group, based on the candidate information and the unit group information sent from the controller 121. In the present embodiment, the group estimator 122 sets the estimation group based further on the known information in some cases. The group estimator 122 estimates the wireless devices 200A located at any candidate positions of the estimation group among the wireless devices 200, based on the communication information. In the present embodiment, the wireless devices 200A are estimated based further on the known information in some cases. The group estimator 122 sends the information of the set estimation group and the estimated wireless devices 200A to the individual estimator 123.

The individual estimator 123 estimates the positions where the respective wireless devices 200A are located from the candidate positions of the estimation group, based on the estimation group and the wireless devices 200A sent from the group estimator 122 and the communication information sent from the controller 121. In the present embodiment, the positions where the respective wireless devices 200A are located are estimated based further on the known information in some cases. The individual estimator 123 sends the information indicating the estimated positions of the respective wireless devices 200A to the controller 121 and the output device 140.

In FIG. 2, the controller 121, the group estimator 122 and the individual estimator 123 are included in the processor 120. The processor 120 is one or more electronic circuits including a control device and an arithmetic operation device. The electronic circuits are achieved by an analog or digital circuit or the like. For example, a general purpose processor, a central processing unit (CPU), a microprocessor, a digital signal processor (DSP), an ASIC, and FPGA and the combination thereof are possible. In addition, the processor 120 may be executed in the electronic circuits by software.

The storage 130 holds the information sent from the controller 121. The storage 130 is a memory or the like, and is a RAM (Random Access Memory), a PROM (Programmable ROM), an EPROM (Erasable PROM), an EEPROM (Electrically EPROM), a flash memory or a register or the like. In addition, the storage 130 may be provided on the outside other than the inside of the estimation apparatus 100. When provided on the outside, the storage 130 may be a cloud which holds the information via the Internet.

The output device 140 outputs the information indicating the estimated positions of the respective wireless devices 200A, which is sent from the individual estimator 123. An output destination and form of the information indicating the estimated positions of the respective wireless devices 200A are arbitrary, and are, for example, a device which analyzes, a device which visually displays and a device which holds the information indicating the estimated positions of the respective wireless devices 200A or the like. The devices may be non-illustrated elements inside the estimation apparatus 100, or may be provided outside the estimation apparatus 100. The output device 140 may include a part of the communicator 111 and output the information indicating the positions of the respective wireless devices 200A by communication.

The configuration of the estimation apparatus 100 has been described above. An estimation operation of the estimation apparatus 100 will be described below. The estimation apparatus 100 acquires the candidate information indicating the plurality of candidate positions where the plurality of wireless devices 200 are located, the communication information regarding the communication among the wireless devices 200, the unit group information regarding the number when grouping some candidate positions of the plurality of candidate positions included in the candidate information, and the known information indicating the positions where some wireless devices of the wireless devices 200 are located. The estimation apparatus 100 sets the estimation group for which some candidate positions of the candidate information are the estimation objects, based on the candidate information and the unit group information. In some cases, the estimation apparatus 100 sets the estimation group based also on the known information. The estimation apparatus 100 estimates the wireless devices 200A located at any candidate positions of the estimation group among the wireless devices 200, based on the communication information. In some cases, the estimation apparatus 100 estimates the wireless devices 200A based also on the known information. The estimation apparatus 100 estimates the positions of the wireless devices 200A from the candidate positions of the estimation group based on the communication information. In some cases, the estimation apparatus 100 estimates the positions of the wireless devices 200A based also on the known information. The estimation apparatus 100 outputs the information indicating the estimated positions of the wireless devices 200A, and acquires the response to the estimated positions of the wireless devices 200A. The estimation apparatus 100 corrects the positions of the wireless devices 200A according to the acquired response, and determines the positions of the wireless devices 200A. The estimation apparatus 100 repeats the setting of the estimation group, the estimation of the wireless devices 200A included in the estimation group, and the estimation of the positions of the wireless devices 200A in the estimation group until there is no more candidate position not set as the estimation group among the candidate positions included in the candidate information. When all the candidate positions included in the candidate information are set as the estimation group and determination of the positions is completed for the wireless devices 200, the operation is ended. Note that the estimation apparatus 100 specifies the respective wireless devices 200 based on the identification information included in the communication information.

Figure 3:
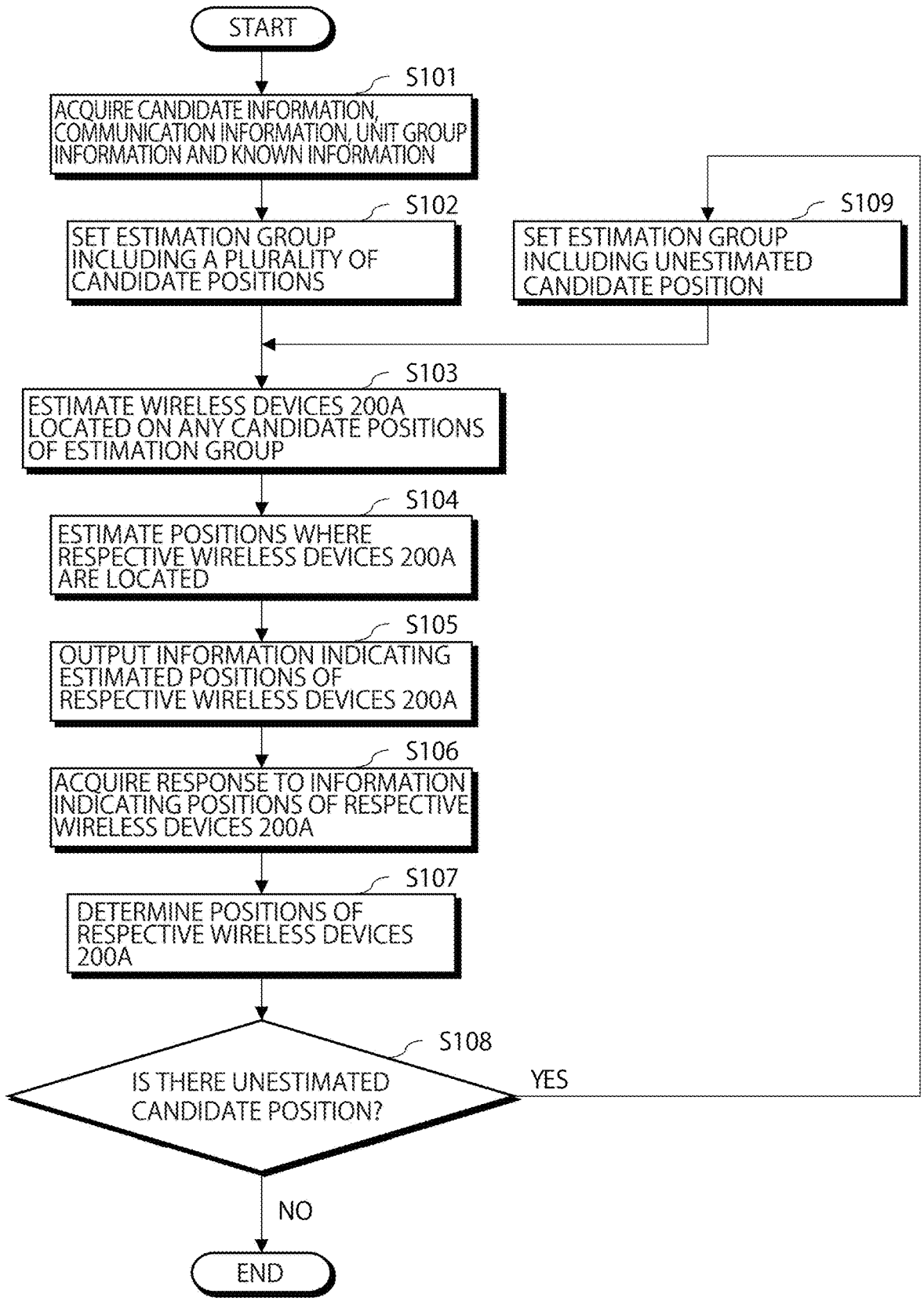
FIG. 3 is a flowchart of an estimation operation of the estimation apparatus 100.
Figure 4:
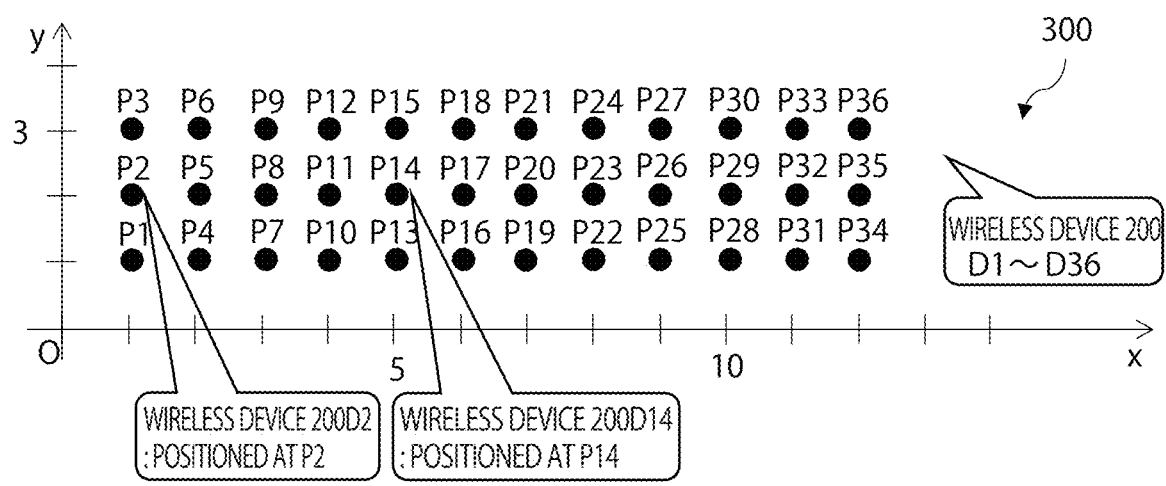
FIG. 4 is a diagram describing positions (coordinates) of candidate positions P1-P36 in the communication system 300.

FIG. 3 is a flowchart of the estimation operation of the estimation apparatus 100. Details of the estimation operation of the estimation apparatus 100 will be described using FIG. 3. The acquirer 110 acquires the candidate information, the communication information, the unit group information and the known information (step S101). In the present embodiment, as one example, the communicator 111 acquires the communication information, and the input device 112 acquires the candidate information, the known information, and the unit group information. The respective kinds of acquired information are sent to the controller 121 and held in the storage 130. The controller 121 sends the candidate information, the unit group information and the known information to the group estimator 122, and sends the communication information and the known information to the individual estimator 123. FIG. 4 is a diagram illustrating the candidate positions of the communication system 300, the wireless devices 200 and the known information as an example of the present embodiment. The communication system 300 has candidate positions P1-P36 as the candidate positions included in the candidate information, and has wireless devices 200D1-200D36 as the wireless devices 200. For the candidate positions P1-P36, the respective positions (coordinates) are distinct. For example, in FIG. 4, each of the candidate positions P1-P36 is specified by an x coordinate and a y coordinate. The candidate position P1 is indicated as (x,y)=(1,1), the candidate position P2 is indicated as (x,y)=(1,2), . . . and the candidate position P36 is indicated as (x,y)=(12,3). The estimation apparatus 100 recognizes that the wireless devices 200 are the wireless devices 200D1-200D36 by the identification information of the wireless devices 200 included in the acquired communication information. The estimation apparatus 100 recognizes that the wireless device 200D2 among the wireless devices 200 is located at the candidate position P2 and the wireless device 200D14 is located at the candidate position P14 by the acquired known information. The estimation apparatus 100 does not know at which candidate positions other than the candidate positions P2 and P14 the wireless devices 200 other than the wireless device 200D2 and the wireless device 200D14 are positioned.

Figure 5:
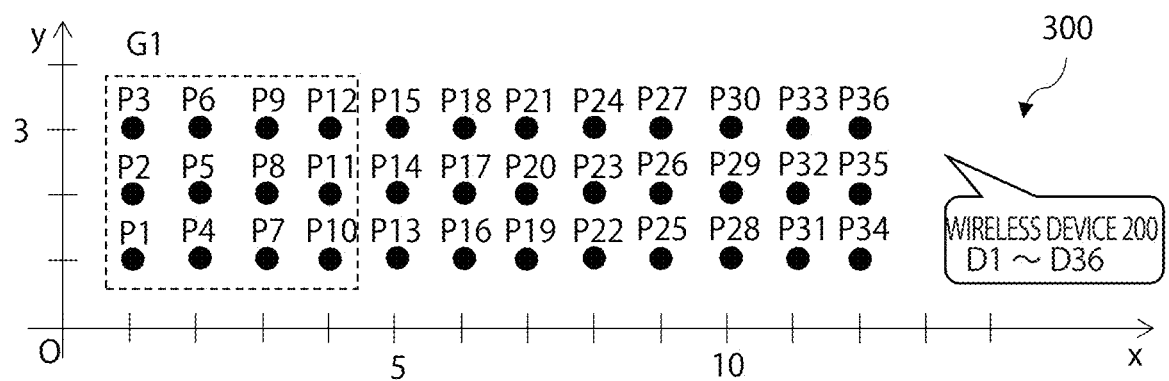
FIG. 5 is a diagram describing an estimation group G1 in a first embodiment.

The group estimator 122 sets the estimation group to be an object to estimate the positions where the wireless devices 200 are located, based on the candidate information, the unit group information and the known information (step S102). The group estimator 122 determines the candidate positions included in the estimation group based on the unit group information. For example, in the present embodiment, it is indicated that 12 candidate positions are included in one estimation group as the unit group information. According to the time usable for the estimation of the positions of the wireless devices 200 and the estimation accuracy, the group estimator 122 may set the candidate positions of the number of which is larger or smaller than the number of the candidate positions included in one estimation group, the number being included in the unit group information, as one estimation group. The group estimator 122 sets the estimation group including some candidate positions based on the known information. FIG. 5 is a diagram illustrating an estimation group G1 in the present embodiment. In FIG. 5, the candidate positions P1-P12 including the candidate position P2 known as the position of the wireless device 200D2 are set as the estimation group G1. By including the known candidate position P2, the wireless devices 200 located at any of the candidate positions P1-P12 of the estimation group G1 can be estimated.

The group estimator 122 estimates the wireless devices 200A located at any candidate positions of the set estimation group, based on the communication information (step S103). In FIG. 5, the wireless devices 200 located at any of the candidate positions P1-P12 of the estimation group G1 are estimated.

An example of a method of estimating the wireless devices 200 located at any of the candidate positions P1-P12 of the estimation group G1 is a method based on a graph division method. In the method, all the wireless devices 200 of the communication system 300 are grouped into the wireless devices 200 (hereinafter, also referred to as wireless devices 200A1) located at any of the candidate positions P1-P12 of the estimation group G1 and the wireless devices 200 located at any of the candidate positions (candidate positions P13-P36) other than the estimation group G1.

Figure 6:
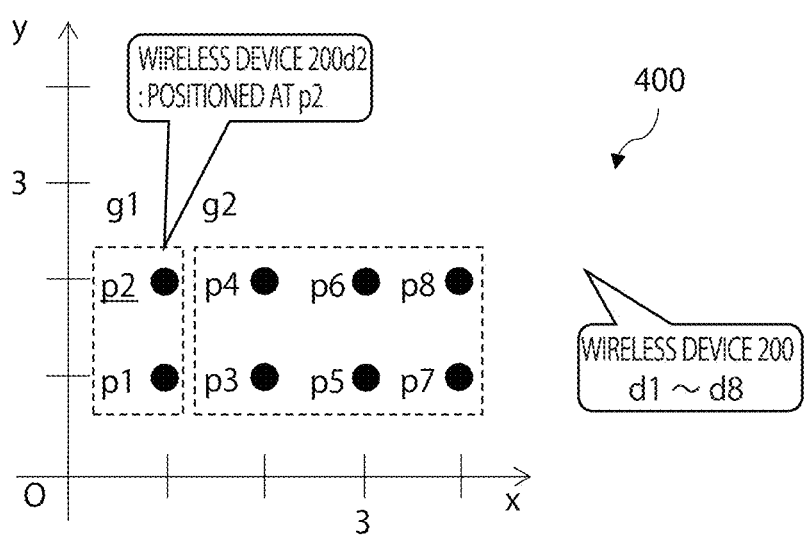
FIG. 6 is a diagram describing a communication system 400 for describing a method based on a graph division method.

The method based on the graph division method will be described below using FIG. 6. FIG. 6 illustrates a communication system 400 for describing the method based on the graph division method. The communication system 400 also includes candidate positions p1-p8 and wireless devices 200d1-d8, similarly to the communication system 300. Each of the candidate positions p1-p8 is specified by the x coordinate and the y coordinate. The candidate position p1 is indicated as (x,y)=(1,1), the candidate position p2 is indicated as (x,y)=(1,2), . . . , and the candidate position p8 is indicated as (x,y)=(4,2). Of the wireless devices 200d1-d8, the wireless device 200d2 is positioned at the candidate position p2. As described in step S101, the estimation apparatus 100 can recognize the above matters by the acquirer 110 acquiring the candidate information, the communication information and the known information. As one example, it is assumed that the group estimator 122 sets an estimation group g1 including the candidate position p1 and the candidate position p2 where it is known that the wireless device 200d2 is positioned, as described in step S102. In FIG. 6, the candidate positions other than the estimation group g1 are indicated as a group g2 as the other group.

The above recognition of the estimation apparatus 100 in step S102 is illustrated in FIGS. 7A and 7B. The estimation apparatus 100 recognizes that the communication system 400 includes the candidate positions p1-p8 by the candidate information and the positions (coordinates) of the respective candidate positions p1-p8. The estimation apparatus 100 recognizes that the wireless device 200d2 is positioned at the candidate position p2 by the known information, but does not know at which of the candidate positions p1 and p3-p8 the wireless devices 200d1 and d3-d8 are positioned. In step S102, the group estimator 122 sets the candidate position p1 and p2 as the estimation group g1 and defines the other candidate positions p3-p8 as the group g2 as the other group, as illustrated in FIG. 7B.

Hereinafter, the wireless devices 200 included in the estimation group g1 and the wireless devices 200 included in the candidate positions other than the estimation group g1 are estimated by the method based on the graph division method. The description below is for the case where the propagation information in the communication among the plurality of wireless devices, which is included in the communication information, is the RSSI.

FIG. 8 illustrates the RSSI between two wireless devices for the wireless devices 200d1-d8. For example, the RSSI in the case where the transmission side wireless device d1 transmits signals to the reception side wireless device d3 is −55 dBm. The RSSI indicates that signal strength is higher when a numerical value is larger (when a negative absolute value is smaller). Since the RSSI between the wireless devices 200 is strongly correlated with a distance, it is assumed that the distance between the two wireless devices 200 is shorter when the RSSI is larger. In an example of an RSSI acquisition method, each of the wireless devices 200d1-d8 broadcasts the signals at predetermined timing not overlapping with the other wireless devices 200. The wireless devices 200 other than the wireless device 200 which has broadcasted the signals receive the broadcasted signals and measure the RSSI. Each of the wireless devices 200 which have received the broadcasted signals transmits the measured RSSI to the communicator 111 including the communication information. By the communicator 111 acquiring the RSSI measured by each of the wireless devices 200d1-d8 as the communication information, the RSSI between the two wireless devices 200 can be acquired in the wireless devices 200d1-d8.

Figure 9A:
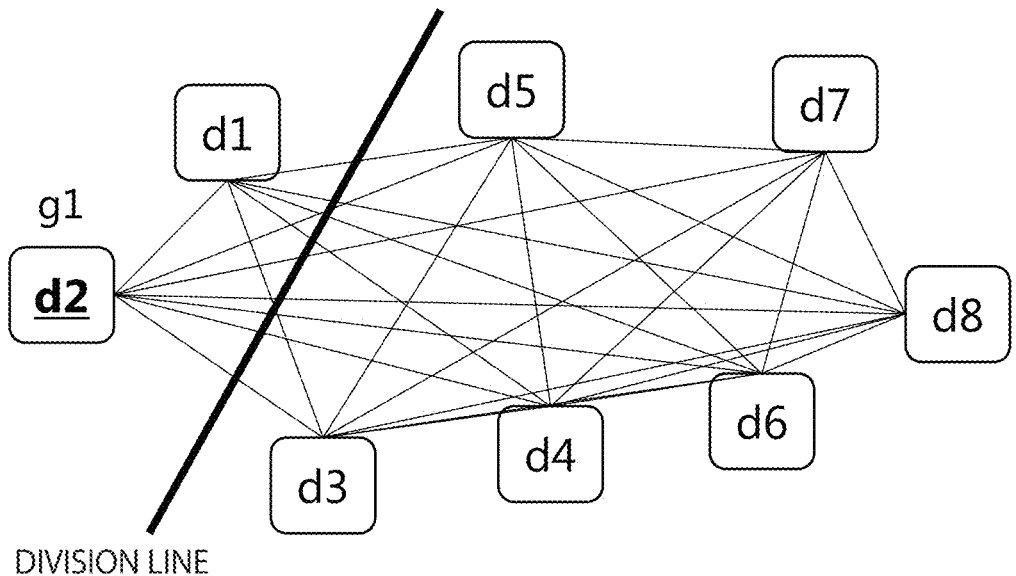
FIGS. 9A and 9B are a schematic diagram of the method based on the graph division method and a diagram describing an example of an estimated result of a group estimator 122.

The group estimator 122 estimates the wireless devices 200A located at any candidate positions of the estimation group g1 by generating a plurality of combinations that can be the estimation group g1 and evaluating the combinations from the propagation information among the wireless devices 200d1-d8. Here, as one example, the RSSI is used as the propagation information. In the method based on the graph division method, the wireless devices 200d1-d8 are defined as nodes, the RSSIs among the wireless devices 200d1-d8 are defined as edges, and which edge is to be cut to divide the two groups g1 and g2 is searched. FIG. 9A is a diagram schematically illustrating the wireless devices 200d1-d8 illustrated as the nodes, the RSSIs among the wireless devices 200d1-d8 indicated as the edges, and a division line which divides the two groups g1 and g2. In FIG. 9A, as one example, the division line is drawn so as to turn the wireless devices 200d1 and d2 to the g1. In the case of the communication system 400, there are seven combinations of the wireless devices 200 that can be the estimation group g1, which are (d1,d2), (d2,d3), (d2,d4), (d2,d5), (d2,d6), (d2,d7) and (d2,d8) (hereinafter, they are also referred to as candidate estimation groups). The group g2 is the other wireless devices 200 not included in the estimation group g1. The group estimator 122 calculates an evaluation value based on the RSSI for each candidate estimation group, and estimates the combination most corresponding to the estimation group g1 as the estimation group g1. For example, the group estimator 122 searches the combination which minimizes weight of the edge to be cut when dividing the two groups g1 and g2 for each candidate estimation group, and estimates the combination as the estimation group g1. For the candidate estimation groups, the evaluation value may be calculated for all the combinations as described above (entire combination search), or some combinations may be omitted by using genetic algorithm or the like.

Figure 9B:
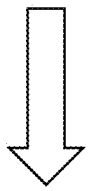

FIG. 9B is a result of the estimation by the group estimator 122 in the communication system 400. As illustrated in FIG. 9B, the group estimator 122 estimates that the wireless devices 200d1 and d2 are the wireless devices 200A located at any candidate positions of the estimation group g1. The wireless devices 200d3-d8 are estimated as being located at any candidate positions of the group g2 which is the other group.

Figure 10:
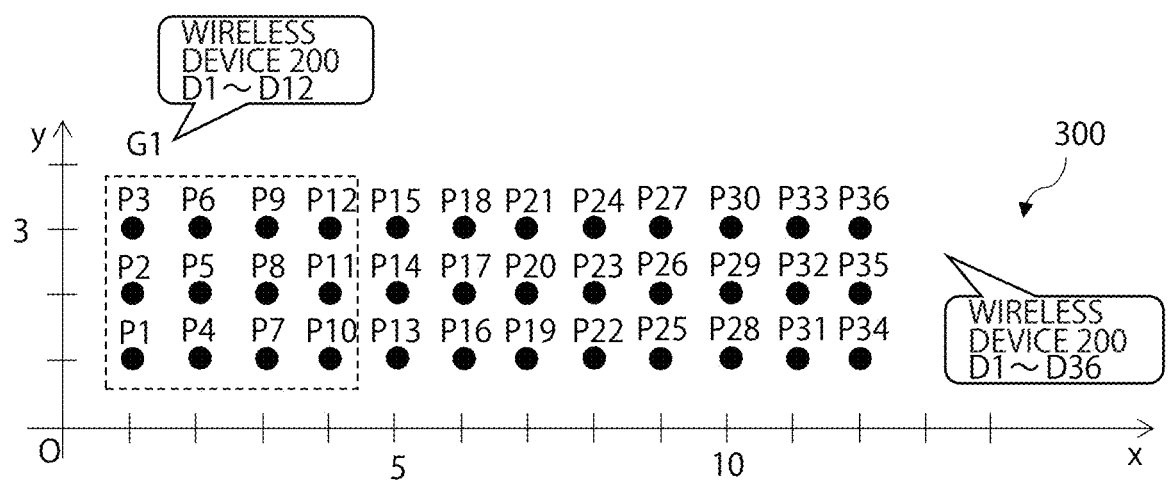
FIG. 10 is a diagram describing wireless devices 200A1 located at any candidate positions of the estimation group G1 in the first embodiment.

The method of estimating the wireless devices 200A located at any candidate positions of the estimation group by the group estimator 122 has been described above. Returning to step S103, the group estimator 122 can estimate the wireless devices 200A located at any candidate positions of the estimation group by the method based on the graph division method. Here, the group estimator 122 recognizes that some of the wireless devices 200A are the known wireless devices 200 from the known information, however, even when the known wireless devices 200 are included, it is referred to as the estimation of the wireless devices 200A. It is assumed that the group estimator 122 estimates the wireless devices 200A even in the case of estimating the wireless devices 200A other than the known wireless devices 200. FIG. 10 is a diagram illustrating the wireless devices 200A1 corresponding to the estimation group G1, which are estimated by the group estimator 122, as an example of the present embodiment. In FIG. 10, the group estimator 122 estimates the wireless devices 200D1-D12 as the wireless devices 200A1. For the candidate positions P13-P36 other than the estimation group G1, the wireless devices 200D13-D36 are set at any positions as the other group. The group estimator 122 sends the information of the estimation group G1 and the wireless devices 200A1 to the individual estimator 123.

Based on the information of the estimation group and the wireless devices 200A sent from the group estimator 122 and the communication information sent from the controller 121, the individual estimator 123 estimates at which candidate positions within the estimation group the respective wireless devices 200A are positioned (step S104). Here, the individual estimator 123 recognizes that some of the wireless devices 200A are the known wireless devices 200 from the known information, however, even when the known wireless devices 200 are included, it is referred to as the estimation of the positions of the respective wireless devices 200A. It is assumed that the individual estimator 123 estimates the positions of the respective wireless devices 200A even in the case of estimating the positions of the respective wireless devices 200A other than the known wireless devices 200. When the information of the estimation group G1 and the wireless devices 200A1 is sent, the individual estimator 123 estimates at which candidate positions within the estimation group G1 the respective wireless devices 200A1 are positioned.

Figure 11:
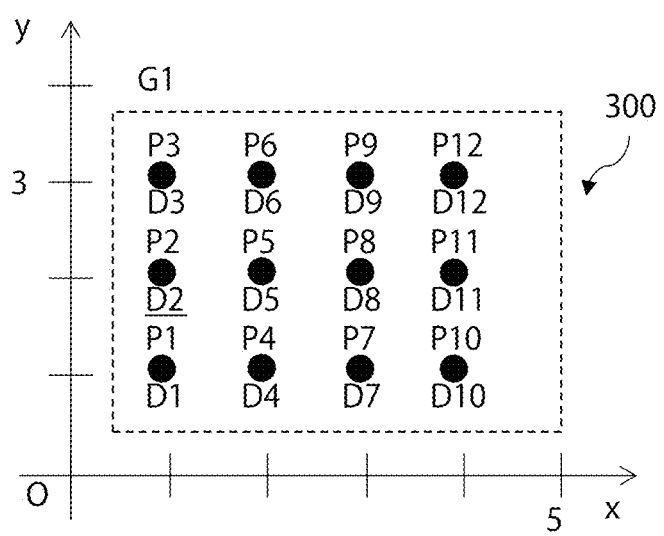
FIG. 11 is a diagram describing positions of the respective wireless devices 200A1 estimated in the first embodiment.

The individual estimator 123 generates a plurality of combinations (hereinafter, also referred to as hypotheses) in which the wireless devices 200D1 and D3-D12 are temporarily arranged at the candidate positions P1 and P3-P12 in the estimation group G1. Since it is known that the wireless device 200D2 is positioned at the candidate position P2, the wireless device 200D2 is positioned at the candidate position P2 in any hypotheses. The individual estimator 123 calculates an evaluation value for each hypothesis, and estimates the combination most appropriate as the arrangement of the wireless devices 200D1-D12 in the estimation group G1 as the positions of the respective wireless devices 200A1. As an example of the evaluation value in the hypothesis, the distance of the wireless devices 200D1-D12 is obtained for each hypothesis, and a correlation between the obtained distance and the RSSI is used. Since the RSSI between the two wireless devices 200 is strongly correlated with the distance, it is assumed that the distance between the two wireless devices 200 is shorter when the RSSI is larger. Then, the individual estimator 123 evaluates if the RSSI of the propagation information is larger when the distance of the respective wireless devices 200D1-D12 in the hypothesis is shorter. For example, the individual estimator 123 estimates the combination in which the correlation between the distance of the respective wireless devices 200D1-D12 in the hypothesis and the RSSI of the propagation information is closest to −1 as the positions of the respective wireless devices 200A1. The individual estimator 123 may obtain the distance of the wireless devices 200D1-D12 for each hypothesis as the evaluation value and obtain a discrepancy degree based on the obtained distance and the RSSI. The individual estimator 123 estimates the combination of the lowest obtained discrepancy degree as the positions of the respective wireless devices 200A1. FIG. 11 is the positions of the respective wireless devices 200A1 estimated by the individual estimator 123 as an example of the present embodiment. The individual estimator 123 estimates that the wireless device 200D1 is positioned at the candidate position P1, the wireless device 200D2 is positioned at the candidate position P2, . . . , and the wireless device 200D12 is positioned at the candidate position P12. The individual estimator 123 sends the information including the estimated positions of the respective wireless devices 200A in the estimation group to the output device 140. In the case of the estimation group G1, the individual estimator 123 sends the information including the positions of the respective wireless devices 200A1 in the estimation group G1 to the controller 121 and the output device 140. The controller 121 may make the storage 130 hold the positions of the respective wireless devices 200A.

The output device 140 outputs the information including the positions of the respective wireless devices 200A in the estimation group, which is sent from the individual estimator 123 (step S105). In the case where the information including the positions of the respective wireless devices 200A1 in the estimation group G1 is sent, the output device 140 outputs the information. While an output destination and an output form are arbitrary, in the present embodiment, as one example, the information is outputted to the output device which can be recognized by a user of the estimation apparatus 100 and to which the user can input the response to the information including the positions of the respective wireless devices 200A in the estimation group.

The acquirer 110 acquires the response to the information including the positions of the respective wireless devices 200A in the estimation group (step S106). In the case of the response to the positions of the respective wireless devices 200A1 in the estimation group G1, the acquirer 110 acquires the response. While the content and form of the response are arbitrary, in the present embodiment, as one example, it is assumed that the user inputs that the outputted positions of the respective wireless devices 200A are correct as the response. In the case where the outputted positions of the respective wireless devices 200A are partially erroneous, the user may input the correct positions of the wireless devices 200A as the response. The acquirer 110 (the input device 112 in this case) acquires the response to the positions of the respective wireless devices 200A from the user. The acquirer 110 sends the information indicating the acquired response to the controller 121.

The controller 121 determines the positions of the respective wireless devices 200A based on the information including the positions of the respective wireless devices 200A in the estimation group, which is sent from the individual estimator 123, and the information indicating the response, which is sent from the acquirer 110, and attains the determined information (step S107). In the case of the estimation group G1, the controller 121 determines the positions of the respective wireless devices 200A1 according to the response. For example, in the case where the response indicates that the positions of the respective wireless devices 200A1 are correct, the controller 121 determines the positions of the respective wireless devices 200A1, which are sent from the individual estimator 123, as being correct, and makes the storage 130 hold them as the determined information. In the case where the storage 130 is made to hold the positions of the respective wireless devices 200A, the controller 121 may determine them according to the response. In the case where the response indicates that the positions of the respective wireless devices 200A1 are to be at least partially corrected, the controller 121 corrects and determines the positions of the respective wireless devices 200A1, which are sent from the individual estimator 123, and makes the storage 130 hold them as the determined information.

The controller 121 confirms whether or not there is a candidate position not set as the estimation group (unestimated for the position of the wireless device 200) among the candidate positions included in the candidate information, based on the candidate information and the determined information (step S108). In the case where all the candidate positions are set as the estimation group (step S108: No), the estimation apparatus 100 ends the estimation operation. In the case where not all the candidate positions are set as the estimation group (step S108: Yes), the controller 121 instructs the group estimator 122 to set the estimation group including the candidate position unestimated for the position of the wireless device 200.

Hereinafter, for the estimation including the candidate positions different from the estimation group G1, the estimation apparatus 100 repeats the operation of step S109 and steps S103-S107. Since the operation of the estimation apparatus 100 is similar, an outline of each step will be described.

Figure 12:
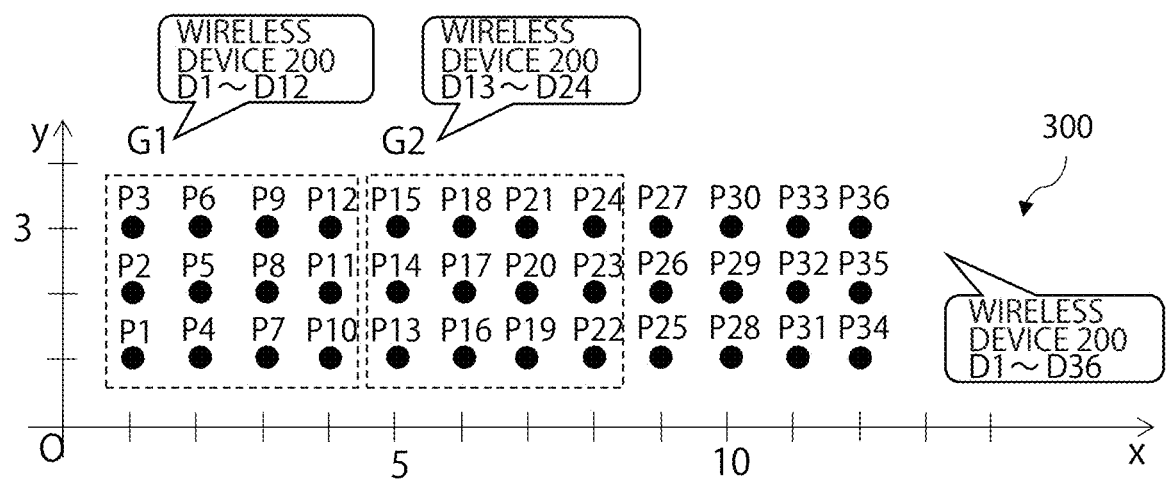
FIG. 12 is a diagram describing an estimation group G2 in the first embodiment and wireless devices 200A2 located at any candidate positions of the estimation group G2.
Figure 13:
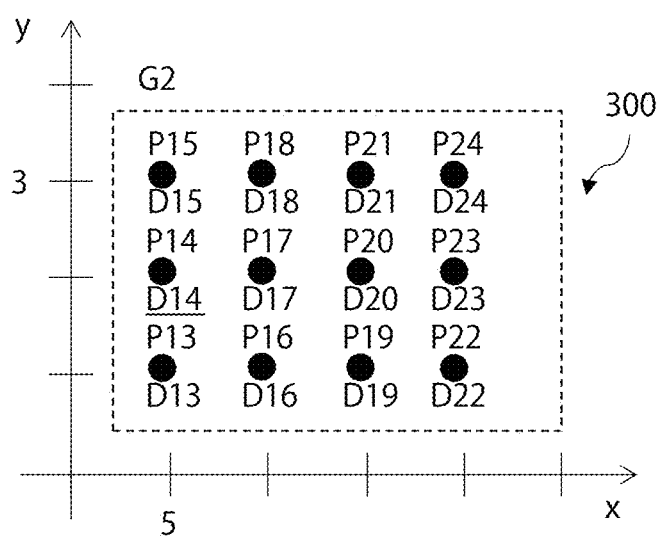
FIG. 13 is a diagram describing positions of the respective wireless devices 200A2 estimated in the first embodiment.

The group estimator 122 sets an estimation group G2 based on the candidate information, the unit group information and the known information (step S109). FIG. 12 is a diagram describing the estimation group G2 in the present embodiment. As illustrated in FIG. 12, the group estimator 122 sets the candidate positions P13-P24 including the candidate position P14 where it is known that the wireless device 200D14 is positioned as the estimation group G2. In the present embodiment, as one example, the group estimator 122 does not include the candidate positions P1-P12 included in the estimation group G1 in the estimation group G2. The group estimator 122 estimates the wireless devices 200A (hereinafter, also referred to as wireless devices 200A2) located at any candidate positions of the estimation group G2 from the previously described method based on the graph division method (step S103). As one example, in FIG. 12, the group estimator 122 estimates the wireless devices 200D13-D24 as the wireless devices 200A2. The individual estimator 123 estimates at which candidate positions of the estimation group G2 the respective wireless devices 200A2 are positioned from the previously described method of evaluating the hypotheses (step S104). FIG. 13 is the positions of the respective wireless devices 200A2 estimated in the present embodiment. The individual estimator 123 estimates that the wireless device 200D13 is positioned at the candidate position P13, the wireless device 200D14 is positioned at the candidate position P14, . . . , and the wireless device 200D24 is positioned at the candidate position P24, respectively. The output device 140 outputs the information including the estimated positions of the respective wireless devices 200A2 in the estimation group G2 (step S105), and the acquirer 110 acquires the response to the positions of the respective wireless devices 200A2 (step S106). The controller 121 determines the positions of the respective wireless devices 200A2 according to the response (step S107), and makes the storage 130 hold them as the determined information in the estimation group G2.

In the case where the positions of the respective wireless devices 200A1 and A2 in the estimation groups G1 and G2 are determined, the candidate positions P25-P36 are unestimated. For the estimation including the candidate positions different from the estimation groups G1 and G2, the estimation apparatus 100 repeats the operation of step S109 and steps S103-S107. Since the operation of the estimation apparatus 100 is similar, the outline of each step will be described.

Figure 14:
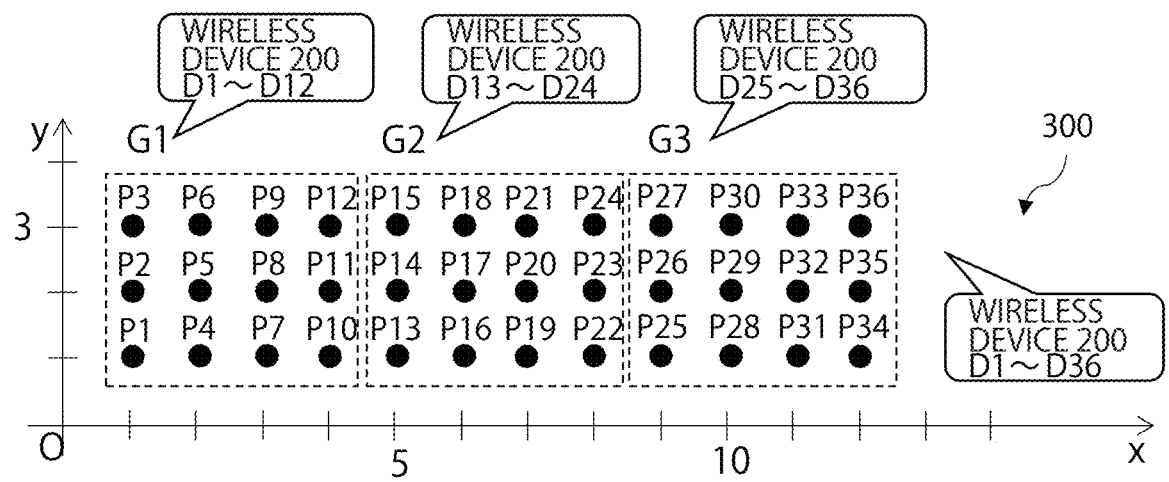
FIG. 14 is a diagram describing an estimation group G3 in the first embodiment and wireless devices 200A3 located at any candidate positions of the estimation group G3.

The group estimator 122 sets an estimation group G3 based on the candidate information and the unit group information (step S109). FIG. 14 is a diagram describing the estimation group G3 of the present embodiment. As illustrated in FIG. 14, the group estimator 122 does not include the candidate positions P1-P24 included in the estimation groups G1 and G2 in the estimation group G3. For the estimation group G3, the remaining candidate positions are grouped. In the case where the group estimator 122 sets the estimation group G3 for which the remaining candidate positions are grouped, the known information required when setting the estimation groups G1 and G2 is not required. It is because, in the case where the estimation group G3 does not include any of the candidate positions P1-P24 included in the estimation groups G1 and G2, the candidate positions included in the estimation group G3 are uniquely determined as the candidate positions other than the estimation groups G1 and G2. The group estimator 122 estimates the wireless devices 200A (hereinafter, also referred to as wireless devices 200A3) located at any candidate positions of the estimation group G3 (step S103). In the estimation of the wireless devices 200A3, the method based on the graph division method is not used. It is because, in the case where the remaining candidate positions are grouped for the estimation group G3, the wireless devices 200A3 among the wireless devices 200 are uniquely determined as the wireless devices other than the wireless devices 200A1 and the wireless devices 200A2. Therefore, there is no need to include the candidate position for which the located wireless device 200 is known in the estimation group G3 for which the remaining candidate positions are grouped. From the above, in the case of performing setting such that the respective groups include all the different candidate positions, the known information is required for ((the number of groups to be set)−1) pieces of the candidate positions.

Figure 15:
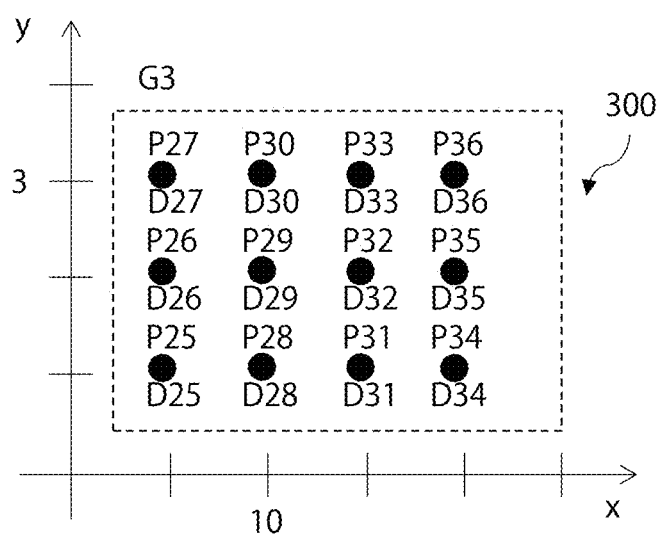
FIG. 15 is a diagram describing positions of the respective wireless devices 200A3 estimated in the first embodiment.

As one example, in FIG. 14, the group estimator 122 estimates the wireless devices 200D25-D36 as the wireless devices 200A3. The individual estimator 123 estimates at which candidate positions of the estimation group G3 the respective wireless devices 200A3 are positioned from the previously described method of evaluating the hypotheses (step S104). FIG. 15 is a diagram illustrating the positions of the respective wireless devices 200A3 estimated in the present embodiment. The individual estimator 123 estimates that the wireless device 200D25 is positioned at the candidate position P25, the wireless device 200D26 is positioned at the candidate position P26, . . . , and the wireless device 200D36 is positioned at the candidate position P36, respectively.

The output device 140 outputs the information including the estimated positions of the respective wireless devices 200A3 in the estimation group G3 (step S105), and the acquirer 110 acquires the response to the positions of the respective wireless devices 200A3 (step S106). The controller 121 determines the positions of the respective wireless devices 200A3 according to the response (step S107), and makes the storage 130 hold them as the determined information in the estimation group G3.

In the case where the positions of the respective wireless devices 200A1, A2 and A3 in the estimation groups G1, G2 and G3 are determined, there is no unestimated candidate position in the candidate positions included in the candidate information (step S108: No). The estimation apparatus 100 ends the estimation operation.

The estimation apparatus 100 of the present embodiment has been described above. The estimation apparatus 100 described in the present embodiment is an example, and modifications can be variously implemented and executed. The modifications of the present embodiment will be described below.

(Modification 1)

Hereinafter, the modification of the estimation operation in the estimation apparatus 100 of the present embodiment will be described. For step S102, while the estimation group is set one by one in the present embodiment, the plurality of estimation groups may be set at once. For example, the estimation groups G1, G2 and G3 in the present embodiment may be set at once in step S102. In this case, a branch in step S108 is if there is the estimation group unestimated for the positions of the wireless devices 200, and step S109 is determination of the estimation group to be the estimation object.

For step S107, in the present embodiment, in the case where the positions of the respective wireless devices 200A are corrected, the corrected positions of the respective wireless devices 200A are turned to the determined information. In the modification, the positions of the respective wireless devices 200A may be estimated (step S104) again based on the corrected positions of the respective wireless devices 200A.

In the present embodiment, the estimation apparatus 100 individually outputs the positions of the respective wireless devices 200A1, the positions of the respective wireless devices 200A2, and the positions of the respective wireless devices 200A3, and individually acquires and determines the response. The estimation apparatus 100 may estimate the respective positions for all the wireless devices 200, then output the positions of the respective wireless devices 200, and acquire the response to determine. In this case, the individual estimator 123 sends the positions of the respective wireless devices 200A1, A2 and A3 to the controller 121, and the controller 121 outputs the information indicating the respective positions for all the wireless devices 200 to the output device 140.

(Modification 2)

Hereinafter, the modification of the various kinds of information used by the estimation apparatus 100 will be described. While the RSSI is used as the propagation information in the present embodiment, a feature amount of the propagation information may be used. For example, an average value, a maximum value and a standard deviation of the RSSI or the average value, the minimum value and the standard deviation of propagation time may be used. By using the feature amount of the propagation information, a data amount of the propagation information can be reduced. The feature amount of the propagation information may be extracted by the respective wireless devices 200. By transmitting the feature amount of the propagation information extracted by the wireless devices 200 to the estimation apparatus 100, an information amount and the time of communication with the wireless devices 200 by the estimation apparatus 100 can be reduced.

The unit group information indicates the number of the candidate positions included in one estimation group in the present embodiment, but may include the information specifying the positions included in the estimation group. For example, by inputting the candidate position that the user wants to confirm as the unit group information, the group estimator 122 sets the estimation group including the candidate position that the user wants to confirm. By the estimation apparatus 100 estimating the positions of the respective wireless devices 200A in the estimation group, a location of the wireless device 200 can be estimated for the candidate position that the user wants to confirm. In addition, a calculation amount can be reduced compared to the case where the estimation apparatus 100 estimates the positions of the respective wireless devices 200 for all the candidate positions included in the candidate information.

(Modification 3)

Hereinafter, the modification of the communication system 300 of the present embodiment will be described. While the description is given by allocating the same number to the wireless devices 200 in the present embodiment, all the wireless devices 200D1-D36 do not need to be the same wireless devices. Arbitrary wireless devices are applicable as long as the communication between the estimation apparatus 100 and the wireless device 200 and the communication among the plurality of wireless devices 200 are possible and the propagation information can be measured.

While the estimation apparatus 100 and the wireless devices 200 are indicated as different devices in the present embodiment, one of the wireless devices 200 may be the estimation apparatus 100. Even in this case, the estimation operation described in the present embodiment is possible.

While the number of the candidate positions and the number of the wireless devices 200 are identical in the present embodiment, they do not always need to be identical. For example, even in the case where the number of the candidate positions is larger than the number of the wireless devices 200 and the wireless device 200 does not exist at some candidate positions, the positions of the respective wireless devices 200 can be estimated from the candidate positions by the method described in the present embodiment.

While the candidate positions P1-P36 are regular (grid-like) positions (coordinates) and the estimation groups G1-G3 are set to be a rectangle in the present embodiment, they do not always need to be regular. The positions (coordinates) of the candidate positions may be at least partially random, and an arbitrary shape is also applicable for the shape of the estimation group. For example, a polygon or a curve may be included.

In the present embodiment, the case where there is not the candidate position for which the located wireless device is known in the estimation group G3, that is, the case where there is not the known information regarding at least one of the candidate positions P25-P36 is described. The acquirer 110 may acquire the known information regarding at least one of the candidate positions P25-P36. The individual estimator 123 can improve the estimation accuracy for the symmetrical candidate positions among the candidate positions included in the estimation group G3 by being based further on the known information regarding at least one of the candidate positions included in the estimation group G3. For example, since the candidate positions P25-P36 of the estimation group G3 are regularly arranged, the case where the positions of the respective wireless devices 200A3 illustrated in FIG. 15 become point symmetrical is also conceivable. For example, the estimation that the wireless devices 200D36 is located at the candidate position P25, the wireless device 200D35 is located at the candidate position P26 and the wireless device 200D34 is located at the candidate position P27 is also conceivable. The individual estimator 123 can perform the estimation excluding the case where the positions of the respective wireless devices 200A3 become point symmetrical by being based further on the known information regarding at least one of the candidate positions included in the estimation group G3.

(Modification 4)

Hereinafter, the modification which achieves functions of the estimation apparatus 100 by a program will be described. The functions performed by components of the estimation apparatus 100 may be achieved by a processor similar to the processor 120 processing the program. The program may be provided by being stored in a computer-readable storage medium such as a CD-ROM, a memory card, a CD-R or a DVD (Digital Versatile Disk) in a file of an installable form or an executable form. Further, the program may be stored on a computer connected to a network such as the Internet and provided via the network, or provided by being incorporated in the storage medium such as a ROM, an HDD or an SSD.

The modifications of the estimation apparatus 100 have been described above. The estimation apparatus 100 of the present embodiment acquires the candidate information and the unit group information, and sets some candidate positions of the candidate positions included in the candidate information to the estimation group. The estimation apparatus 100 estimates the wireless devices 200A located at any candidate positions of the estimation group among the wireless devices 200, and estimates the positions where the wireless devices 200A are located from the estimation group. By estimating the positions where the wireless devices 200 are located for each estimation group, the estimation apparatus 100 can reduce the calculation amount required for the estimation compared to the case of performing the estimation without grouping, and can reduce the estimation time and improve the estimation accuracy in the fixed estimation time. The combinations of the candidate positions and the wireless devices located at any candidate positions exist for a factorial of the candidate positions. Since the communication system 300 illustrated in FIG. 4 of the present embodiment includes 36 candidate positions and 36 wireless devices 200, in the case of estimating the positions where the respective wireless devices 200 are located at once, it is required to estimate the most appropriate combination from 36! kinds of combinations. By estimating the positions where the respective wireless devices 200 are located in division of three estimation groups for example as in the present embodiment, the most appropriate combination is estimated from 3×12! kinds of combinations, and the calculation amount of the estimation apparatus 100 can be reduced.

Second Embodiment

The second embodiment will be described. The second embodiment is the communication system 300 similar to the first embodiment. Since the configuration and estimation operation of the estimation apparatus 100, the wireless devices 200D1-D36 and the candidate positions P1-P36 are similar, points different from the first embodiment will be described.

In the second embodiment, the estimation apparatus 100 considers the estimation accuracy for each candidate position so that the estimation accuracy of the estimation apparatus 100 can be improved. In addition, the estimation apparatus 100 sets the estimation group including at least some of the candidate positions included in the previously estimated estimation group, when setting the second and succeeding estimation groups (step S109 in the first embodiment). Thus, the candidate positions for which the located wireless devices 200 are known can be reduced.

Figure 16:
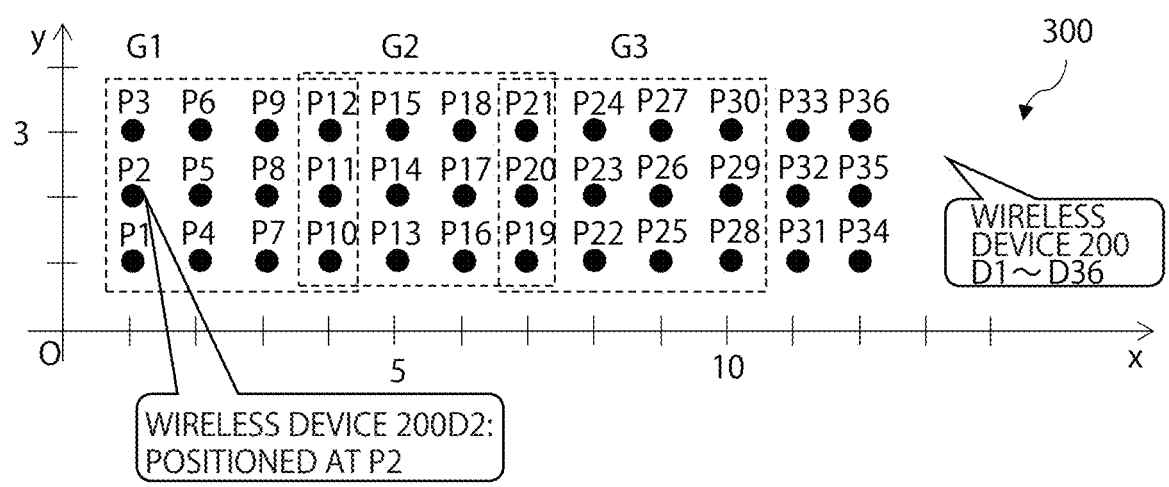
FIG. 16 is a diagram describing the estimation groups G1-G3 in a second embodiment.

FIG. 16 is a diagram illustrating the estimation groups G1-G3 set by the group estimator 122, as an example of the present embodiment. The group estimator 122 is similar to the first embodiment from the setting of the estimation group G1 to the estimation of the positions of the respective wireless devices 200A1. As one example, in the case of using the RSSI as the propagation information, for the estimation of the positions of the respective wireless devices 200A, a possibility of mistaking the estimation of the located wireless device 200 is high (the estimation accuracy is low) for the candidate positions at corners or ends of the estimation group compared to the other candidate positions. The reason will be described using FIG. 17 and FIG. 18.

Figure 17:
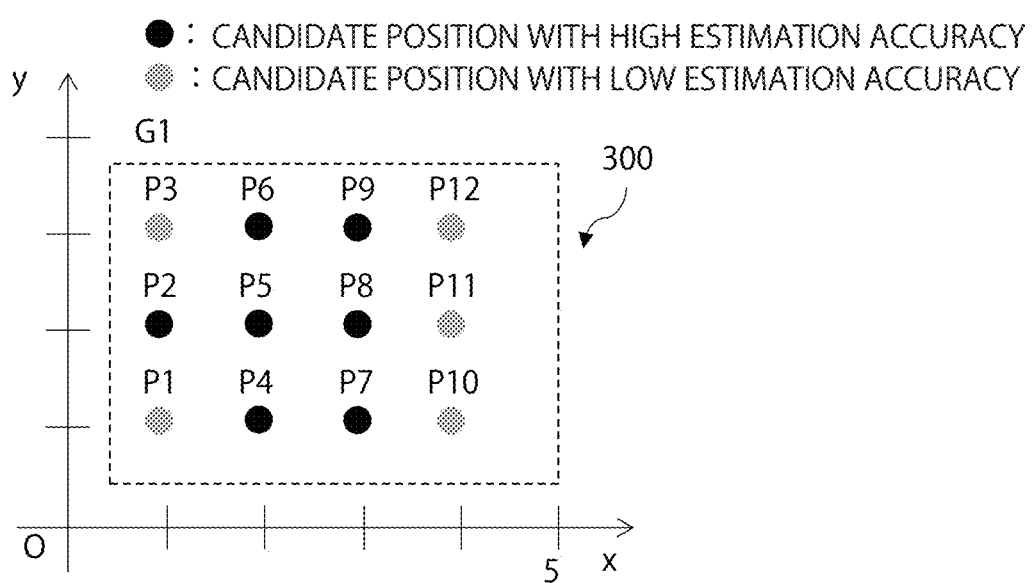
FIG. 17 is a diagram describing estimation accuracy of the candidate positions where it is estimated that the wireless devices 200 are respectively located.

FIG. 17 is a diagram illustrating a degree of the estimation accuracy for the positions of the respective wireless devices 200A1 in the estimation group G1, as an example. The estimation group G1 is a rectangular group having a long side in an x axial direction. In this case, the estimation accuracy is low for columns at the end in the x axial direction (the candidate positions P1-P3 and P10-P12) compared to the other columns (the candidate positions P4-P6 and P7-P9). In addition, the estimation accuracy is low for the corners (the candidate positions P1, P3, P10 and P12) of the estimation group G1 compared to the other candidate positions of the estimation group G1.

Figure 18:
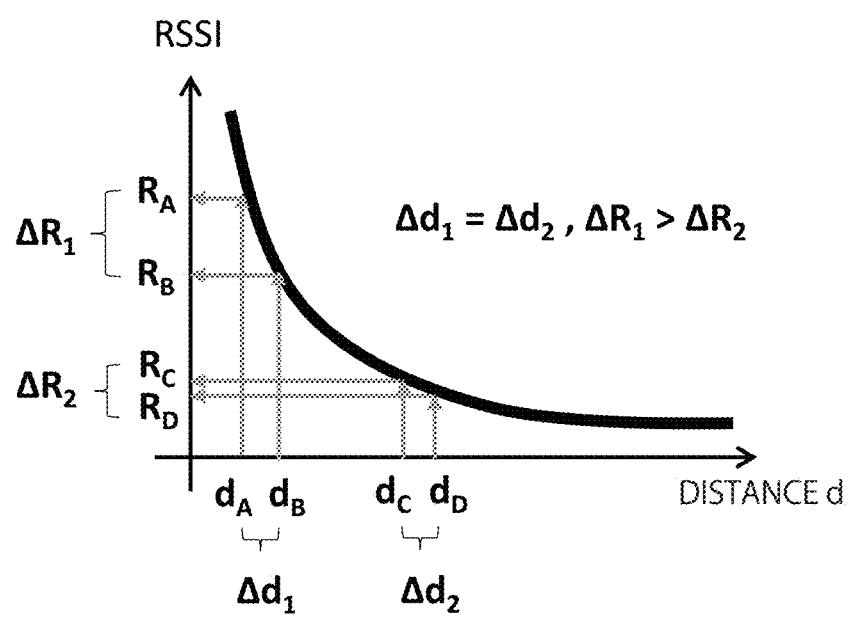
FIG. 18 is a diagram illustrating a relation between the RSSI and a distance.

FIG. 18 is a diagram illustrating a relation between the RSSI and an actual distance. The RSSI among the plurality of wireless devices 200 attenuates in proportion to a power of the distance. For example, in a free space, the RSSI attenuates in proportion to a square of the distance. Even when a difference of the distance is the same, the difference of the RSSI corresponding to the difference of the distance is not fixed. In FIG. 18, one wireless device which broadcasts signals among the wireless devices 200 and the RSSI according to the distance from the wireless device are illustrated. It is assumed that $R_A$ at a distance $d_A$, $R_B$ at a distance $d_B$, $R_C$ at a distance $d_C$ and RD at a distance $d_D$. A difference $\Delta d_1$ from the distance $d_A$ to the distance $d_B$ and a difference $\Delta d_2$ from the distance $d_C$ to the distance $d_D$ are equal. However, between a difference $\Delta R_1$ of $R_A$ and $R_B$ and a difference $\Delta R_2$ of $R_C$ and $R_D$, $\Delta R_2$ is smaller than $\Delta R_1$. In such a manner, the change of the measured RSSI becomes small as separating from the wireless device which broadcasts the signals.

On the other hand, fluctuation due to a factor other than the distance is generated in the RSSI. For example, it is the fluctuation by multipath fading. In the fluctuation, a length of the distance does not give influence as much as attenuation of the RSSI. Since the RSSI attenuates in proportion to the power of the distance, the influence of the fluctuation due to the factor other than the distance on the RSSI increases as the distance increases. Accordingly, for the candidate positions at the corners of the estimation group or at the ends of the long side, the estimation accuracy of the positions of the respective wireless devices 200A becomes low. In FIG. 17, the estimation accuracy is low for the candidate positions P1, P3 and P10-P12 compared to the other candidate positions of the estimation group G1. The estimation accuracy is originally low for the candidate position P2, however, since it is known that the wireless device 200D2 is located, the candidate position P2 is not included in the candidate positions with the low estimation accuracy in FIG. 17.

The individual estimator 123 outputs at least some of the estimated positions of the respective wireless devices 200A in step S105. For example, the individual estimator 123 may output the candidate position for which the estimation accuracy is assumed to be low, in order to acquire the response to the candidate positions for which the estimation accuracy is assumed to be low for the positions where the wireless devices 200A are located. That is, the individual estimator 123 may output the candidate positions for which the user should confirm the identification information of the wireless devices 200 (the candidate positions requiring confirmation of the identification information of the wireless devices 200 by the user). By the individual estimator 123 outputting the candidate positions for which the estimation accuracy is assumed to be low, the user is urged to confirm the wireless devices 200 disposed at the candidate positions for which the estimation accuracy is assumed to be low. By acquiring the response to the candidate positions for which the estimation accuracy is assumed to be low from the user, the accuracy of the determined information can be improved. As described in the modification 1, the estimation apparatus 100 may estimate the positions where the wireless devices 200A are respectively located in the estimation group again according to the response to the candidate positions for which the estimation accuracy is assumed to be low.

The information indicating the positions of the wireless devices 200A1 in the estimation group G1 is held in the storage 130 as the determined information by the estimation or (and) the response again. The controller 121 instructs the group estimator 122 to set the estimation group including the candidate positions unestimated for the positions of the wireless devices 200, and sends the determined information in the estimation group G1. The group estimator 122 sets the estimation group G2 based on the candidate information, the unit group information, and the determined information in the estimation group G1. Specifically, the group estimator 122 sets the estimation group G2 including some of the candidate positions included in the estimation group G1. As one example, in FIG. 16, the candidate positions P10-P21 are set as the estimation group G2. The candidate positions P10-P12 are included also in the estimation group G1.

When estimating the wireless devices 200A2 located at any candidate positions of the estimation group G2 (step S103), the group estimator 122 can use the determined information in the estimation group G1 as the known information. Thus, the number of the candidate positions for which the located wireless devices 200 are known can be reduced. Specifically, there should be one candidate position for which the located wireless device 200 is known, which is required when setting the estimation group G1. Since the operation of the estimation apparatus 100 after the estimation group G2 is set is similar to the first embodiment, the description is omitted. Also in the setting of the estimation group G3, similarly to the setting of the estimation group G2 in the present embodiment, the estimation group is set including at least some of the candidate positions included in the previously estimated estimation group. As one example, the candidate positions P19-P30 are set as the estimation group G3 in FIG. 16. The candidate positions P19-P21 are included also in the estimation group G2. Hereafter, similarly to the first embodiment, the setting of the estimation group, the estimation of the wireless devices 200A located at any of the estimation group, and the estimation of the positions of the respective wireless devices 200A are performed until there is no more unestimated candidate position among the candidate positions included in the candidate information.

The estimation apparatus 100 in the present embodiment has been described above. The estimation apparatus 100 described in the present embodiment is an example, and the modifications can be variously implemented and executed. For example, the modifications in the first embodiment are also applicable to the present invention. The modifications in the setting of the estimation group will be described below.

(Modification 1)

Figure 19:
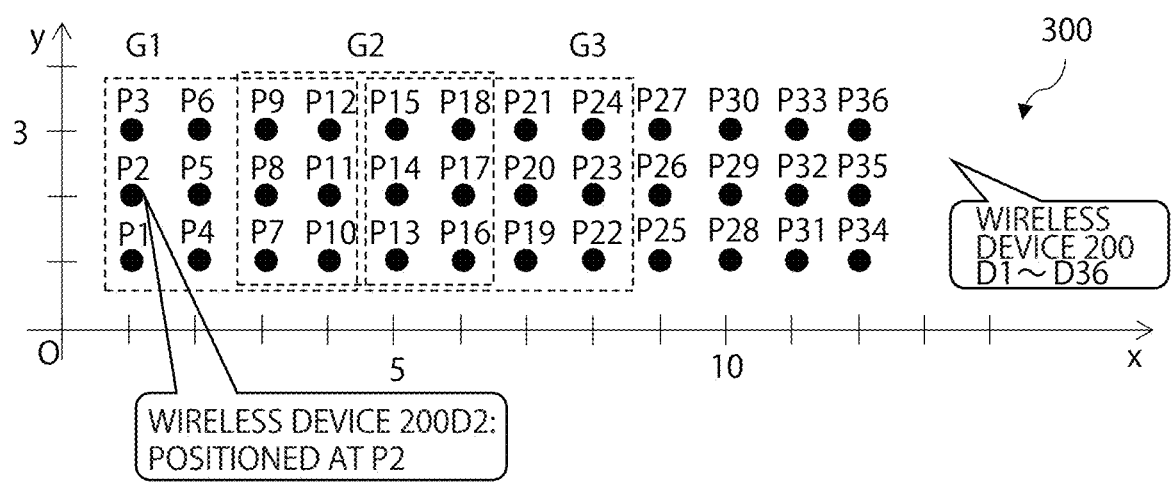
FIG. 19 is a diagram describing the estimation groups G1-G3 in a modification 1 of the second embodiment.

In FIG. 16, as an example, the group estimator 122 sets a new estimation group including the column at the end of the estimation group for which the positions of the respective wireless devices 200A are previously estimated. FIG. 19 is a diagram illustrating the modification of a new estimation group to be set. In FIG. 19, the group estimator 122 sets a new estimation group including the plurality of columns from the estimation group for which the positions of the respective wireless devices 200A are previously estimated. For example, the group estimator 122 sets the candidate positions P7-P18 included also in the estimation group G1 as the estimation group G2. For the candidate positions P7-P9, the adjacent candidate positions are only the candidate positions of the same estimation group G1. As described in FIG. 17, since the candidate positions P7-P9 are in the column at the end of the estimation group G2, the estimation accuracy is low, however, since they are not in the column at the end of the estimation group G1, the estimation accuracy is high. By using an estimated result of the candidate positions P7-P9 with the high estimation accuracy in the estimation group G1, the group estimator 122 can improve the accuracy of the estimation of the wireless devices 200A2 located at any candidate positions of the estimation group G2 and the estimation of the positions of the respective wireless devices 200A2. From the above, the group estimator 122 can improve the estimation accuracy by setting a new estimation group including the candidate positions with the high estimation accuracy.

Note that the group estimator 122 may use only the candidate positions with the high estimation accuracy in the estimation group for which the positions of the respective wireless devices 200A are previously estimated as the known information. It is because there is a possibility that the candidate positions with the low estimation accuracy are not corrected in a process of attaining the determined information.

(Modification 2)

The group estimator 122 may set a new estimation group including the entire estimation group for which the positions of the respective wireless devices 200A are previously estimated. In this case, a different number of the candidate positions may be set depending on the estimation group. In this way, the estimation accuracy for the new estimation group of the group estimator 122 and the individual estimator 123 can be improved.

Figure 20:
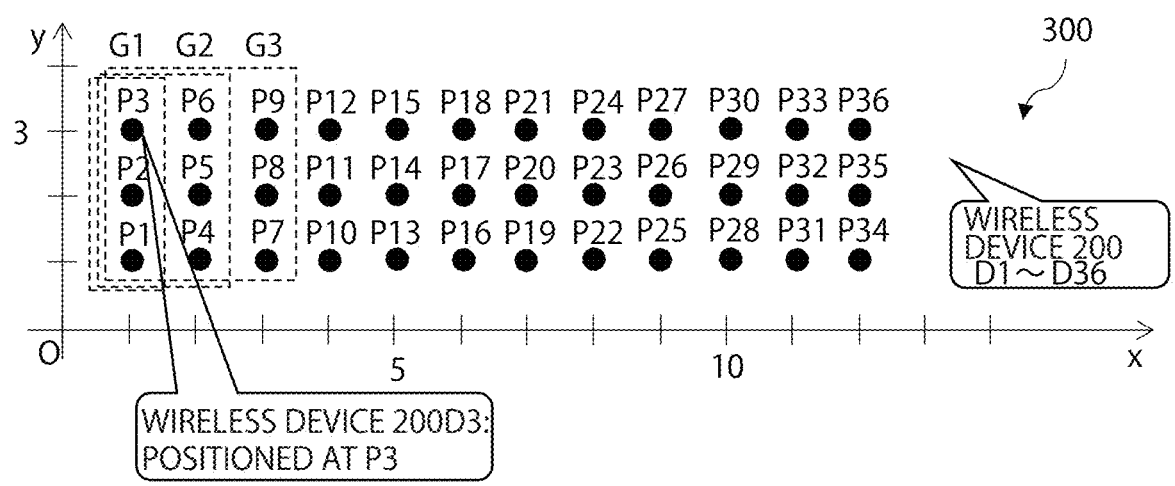
FIG. 20 is a diagram describing the estimation groups G1-G3 in a modification 2 of the second embodiment.

FIG. 20 is a diagram illustrating the modification of a new estimation group to be set. In FIG. 20, the group estimator 122 sets a new estimation group including the candidate positions of the estimation group for which the positions of the respective wireless devices 200A are previously estimated. At the time, the number of the candidate positions to be included in the estimation group is successively increased based on the unit group information. Note that, in the present modification, it is known that the wireless device 200D3 is located at the candidate position P3, and the RSSI is used as the propagation information.

For example, FIG. 20 illustrates an example of the case where the unit group information is 3. The group estimator 122 sets the candidate positions P1-P3 as the estimation group G1. After the positions where the wireless devices 200A1 of the estimation group G1 are determined, the group estimator 122 sets the candidate positions P1-P6 including all the candidate positions of the estimation group G1 as the estimation group G2.

The group estimator 122 can highly accurately estimate the wireless devices 200A1 located at any of the candidate positions P1-P3 included in the estimation group G1 by the method based on the group division method using the RSSI, which is described in the first embodiment. It is because the combinations of the great distance between the candidate positions of the estimation group G1 and the estimation group other than the estimation group G1 increase, that is, the combinations of a small RSSI value between the two wireless devices 200 increase. When the combinations of the small RSSI value between the two wireless devices 200 increase, the possibility that the evaluation value obtained from the RSSIs becomes small increases, and the estimation accuracy is improved. In addition, the individual estimator 123 can highly accurately estimate the positions of the respective wireless devices 200A1 in the estimation group G1 since the candidate position P3 is known.

The group estimator 122 can highly accurately estimate the wireless devices 200A2 located at any of the candidate positions P1-P6 included in the estimation group G2 by using the estimated result of the estimation group G1. In addition, the individual estimator 123 can highly accurately estimate the positions of the respective wireless devices 200A2 in the estimation group G2 by using the estimated result of the estimation group G1. In the case of the estimation group G3, similarly, the estimation of the wireless devices 200A3 located at any of the candidate positions P1-P9 included in the estimation group G3 and the estimation of the positions of the respective wireless devices 200A3 in the estimation group G3 can be highly accurately performed by using the estimated result of the estimation group G2.

In the present modification, as an example, the example of the case of using a unique value as the unit group information is described, however, the value may be appropriately changed. For example, six candidate positions may be included in the estimation group G1 to be estimated first and the candidate positions included in the estimation groups to be set thereafter may be increased by three each.

The modifications of the estimation apparatus 100 in the present embodiment have been described above. The estimation apparatus 100 of the present embodiment can improve the estimation accuracy by outputting the information indicating the positions of the wireless devices 200A in consideration of the estimation accuracy for each candidate position and turning it to the determined information according to the response from the user. In addition, the estimation apparatus 100 sets a new estimation group including some of the candidate positions of the previously estimated estimation group. The estimation apparatus 100 can reduce the candidate positions for which the located wireless devices 200 are known by using at least some of the determined information of the previously estimated estimation group as the known information. Further, the estimation apparatus 100 can reduce the positions of the respective wireless devices 200A in the estimation group to be outputted, and can reduce estimation candidates that the user should confirm.

According to at least one embodiment described above, the calculation amount of the estimation apparatus 100 can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
processing circuitry configured to:
generate, based on first information indicating a plurality of candidate positions where a plurality of wireless devices are located, a plurality of groups each including two or more of the candidate positions, and
for each group selected from the plurality of groups, estimate correspondences between the candidate positions in the selected group and first wireless devices located in the candidate positions in the selected group, based on second information regarding received power of communications between the plurality of wireless devices located at any of the plurality of candidate positions indicated in the first information, third information indicating a position at which at least one of the plurality of wireless devices is located in the selected group, and identification information of the at least one wireless device, wherein:
the selected group includes the position indicated in the third information, and the estimated correspondences include correspondence of the at least one wireless device and the position at which the at least one wireless device is located,
the plurality of groups includes a first group and a second group,
the electronic apparatus further comprises:
output circuitry configured to output at least one first position for which identification information of the first wireless device is required to be confirmed among the positions where the first wireless devices are estimated to be located for the first group; and
acquisition circuitry configured to acquire a first response to the first position, and
the processing circuitry is configured to estimate, according to the first response, correspondences between the candidate positions in the second group and the wireless devices located at the candidate positions in the second group, the candidate positions in the second group including the first position.

2. The electronic apparatus according to claim 1, wherein the processing circuitry is configured to generate the plurality of groups based further on fourth information including at least one of:
a number of the candidate positions to be included in each of the plurality of groups; and
positions of the candidate positions to be included in each of the plurality of groups.

3. The electronic apparatus according to claim 1, wherein the processing circuitry is configured to estimate the correspondences between the candidate positions in the selected group and the first wireless device located at the candidate positions in the selected group based on fifth information on communication between the plurality of wireless devices.

4. The electronic apparatus according to claim 3, wherein:
the output circuitry is further configured to output information indicating at least part of the positions where the first wireless devices are located,
the acquisition circuitry is further configured to acquire a second response to the information indicating the at least part of the positions where the first wireless devices are located, and
the processing circuitry corrects the positions where the first wireless devices are located according to the second response.

5. The electronic apparatus according to claim 1, wherein:
the processing circuitry generates the second group including the candidate positions which include at least part of the positions where the first wireless devices are estimated to be located for the first group, and
the processing circuitry generates the correspondences between the candidate positions in the second group and wireless devices located at the candidate positions in the second group so as to include the correspondence between the at least part of the positions and the first wireless devices located at the at least part of the positions.

6. The electronic apparatus according to claim 5, wherein:
the processing circuitry generates the second group so as to include more candidate positions than are included in the first group, and
the processing circuitry generates the correspondences between the candidate positions in the second group and wireless devices located at the candidate positions in the second group so as to include the correspondence between the at least part of the positions and the first wireless devices located at the at least part of the positions.

7. The electronic apparatus according to claim 5, wherein the candidate positions in the second group include at least part of the positions where the first wireless devices are estimated to be located for the first group, the at least part of the positions are not adjacent to candidate positions other than the candidate positions in the first group.

8. The electronic apparatus according to claim 5, wherein the processing circuitry is configured to estimate the positions where the first wireless devices are located from the candidate positions in the second group based on fifth information on communication between the plurality of wireless devices.

9. The electronic apparatus according to claim 1, wherein the second information includes an RSSI (Received Signa Strength Indicator).

10. The electronic apparatus according to claim 1, wherein the fifth information includes information indicating propagation time of a radio wave, and communication among the wireless devices is compliance with UWB.

11. An electronic system comprising:
the electronic apparatus according to claim 1; and
the plurality of wireless devices.

12. A method comprising:
generating, by processing circuitry, based on first information indicating a plurality of candidate positions where a plurality of wireless devices are located, a plurality of groups each including two or more of the candidate positions;
for each group selected from the plurality of groups, estimating, by the processing circuitry, correspondences between the candidate positions in the selected group and first wireless devices located in the candidate positions in the selected group, based on (i) second information regarding received power of communications between the plurality of wireless devices located at any of the plurality of candidate positions indicated in the first information, (ii) third information indicating a position at which at least one of the plurality of wireless device is located in the selected group, and (iii) identification information of the at least one wireless device,
wherein:
the selected group includes the position indicated in the third information, and the estimated correspondences include correspondence between the at least one wireless device and the position at which the at least one wireless device is located,
the plurality of groups includes a first group and a second group, the method further comprises
outputting, by output circuitry, at least one first position for which identification information of the first wireless device is required to be confirmed among the positions where the first wireless devices are estimated to be located for the first group;
acquiring, by acquisition circuitry, a first response to the first position; and
estimating, by the processing circuitry, according to the first response, correspondences between the candidate positions in the second group and the wireless devices located at the candidate positions in the second group, the candidate positions in the second group including the first position.

13. A non-transitory computer readable medium having a computer program stored therein that is executable by a computer to cause the computer to perform processes comprising:

generating, based on first information indicating a plurality of candidate positions where a plurality of wireless devices are located, a plurality of groups each including two or more of the candidate positions; and for each group selected from the plurality of groups, estimating correspondences between the candidate positions in the selected group and first wireless devices located in the candidate positions in the selected group, based on (i) second information regarding received power of communications between the plurality of wireless devices located at any of the plurality of candidate positions indicated in the first information, (ii) third information indicating a position at which at least one of the plurality of wireless device is located in the selected group, and (iii) identification information of the at least one wireless device, wherein:

the selected group includes the position indicated in the third information, and the estimated correspondences include correspondence between the at least one wireless device and the position at which the at least one wireless device is located, the plurality of groups includes a first group and a second group, the program is executable by the computer to cause the computer to perform further processes comprising:

outputting at least one first position for which identification information of the first wireless device is required to be confirmed among the positions where the first wireless devices are estimated to be located for the first group;

acquiring a first response to the first position, and estimating, according to the first response, correspondences between the candidate positions in the second group and the wireless devices located at the candidate positions in the second group, the candidate positions in the second group including the first position.

* * * * *